United States Patent
Hubbard

(12) 
(10) Patent No.: US 6,238,502 B1
(45) Date of Patent: *May 29, 2001

(54) SINGLE-FLY MEMBRANE ROOFING SYSTEM

(75) Inventor: Michael J. Hubbard, Holland, OH (US)

(73) Assignee: Omnova Solutions Inc., Fairlawn, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/140,160

(22) Filed: Aug. 26, 1998

Related U.S. Application Data

(62) Division of application No. 08/706,027, filed on Aug. 30, 1996, now Pat. No. 6,004,645.

(51) Int. Cl.[7] .............................. B32B 7/08; B32B 7/12; E04B 1/62; E04D 5/06; E04D 5/14
(52) U.S. Cl. ..................... 156/71; 156/290; 156/291; 156/308.4; 52/552; 52/746.11; 52/410
(58) Field of Search .................................. 156/71, 308.4, 156/290, 291; 52/552, 746.11, 410

(56) References Cited

U.S. PATENT DOCUMENTS

| 4,671,036 | * | 6/1987 | Sullivan . |
| 4,718,211 | * | 1/1988 | Russell et al. . |
| 5,775,052 | * | 7/1998 | Mayle . |

* cited by examiner

*Primary Examiner*—Sam Chuan Yao
(74) *Attorney, Agent, or Firm*—Robert F. Rywalski; Larry R. Meenan

(57) ABSTRACT

A method of applying a roof membrane assembly to a roof deck. The method includes the steps of providing a roof membrane assembly including a first roof membrane and a second roof membrane. The first roof membrane has at least one longitudinally extending edge and the second roof membrane overlaps the first roof membrane and is bonded along at least one longitudinally extending edge of the first roof membrane to define a membrane flap having a longitudinally extending edge. The roof membrane assembly is then positioned upon the roof deck and at least one roof membrane fastening device is positioned over the first roof membrane and beneath the longitudinally extending membrane flap and secured through the first roof membrane and into the roof deck. The longitudinally extending edge of the membrane flap is then bonded to the first roof membrane.

13 Claims, 2 Drawing Sheets

SINGLE-PLY MEMBRANE ROOFING SYSTEM

CROSS-REFERENCE TO A RELATED PATENT APPLICATION

This application is a divisional of application Ser. No. 08/706,027 filed Aug. 30, 1996 now U.S. Pat. No. 6,004,645, the disclosure of which is incorporated herein by reference.

FIELD OF THE INVENTION

This invention relates to a single-ply membrane roofing system. More particularly, this invention relates to a single-ply membrane roofing system having improved resistance to wind uplift forces.

BACKGROUND OF THE INVENTION

A roofing system generally includes a roof deck which is considered the structural supporting surface of a building extending between the surrounding exterior walls of the building. The roof deck may be constructed from plywood, metal decking or concrete or any other suitable material. Depending upon the construction, the roof deck may extend over the surrounding exterior walls or the roof deck may stop short of the exterior walls thereby forming a parapet wall, i.e., a low retaining wall at the edge of the roof deck. If desired, the roofing system may also include an insulation barrier formed from polyisocyanarate or any other suitable material applied over the roof deck.

To make the roof deck and building weather resistant a single-ply membrane roof is installed over the roof deck. The single-ply membrane roof refers to a water impermeable single sheet of polymeric material such as ethylene propylene diene rubber (EPDM) having a preapplied hot melt adhesive, chlorinated polyethylene, polyvinyl chloride, or chlorosulfanated polyethylene. The membrane roof has heretofore been installed on the roof deck using a variety of different methods.

For example, the field or interior of the membrane roof may be held to the roof deck by the use of ballast and/or penetrating or non-penetrating fastener means as known in the art. An example of a penetrating fastener means for retaining the field of a membrane roof installed to a roof deck is by utilizing a plurality of small, circular, metal plates having a hole in the center and a roofing screw or other suitable fastener. In order to anchor the membrane roof, the small, circular, metal plates are spaced apart in rows on the membrane roof and the fastener is driven through the hole in each plate, the membrane roof, any insulation material and then into the roof deck. The metal plates are then covered by overlapping roof membrane. An example of a non-penetrating fastener means would include totally adhering the field of the membrane roof to the roof deck.

An important consideration for a mechanically fastened membrane roof system is that the system withstand wind uplift forces. Consequently, in order to withstand wind uplift forces the membrane is typically fastened to the deck at close intervals over the entire membrane surface thereby minimizing the areas of membrane not secured to the roof deck. If the membrane sheets are secured only along the longitudinal edges the width of the membrane sheets should be restricted to a dimension of about 5–6 feet in order to ensure adequate resistance to uplift in the membrane between fastening locations.

Although the many known variations for attaching a membrane roof to a roof deck have been proven to perform satisfactorily under certain conditions, further improvements on attaching a membrane roof to a roof deck are desired.

One object of the present invention is to provide an inexpensive mechanically fastened single-ply roofing system of improved durability under a wide range of climatic conditions and improved resistance to wind uplift forces. Yet another object of the present invention is to provide an improved membrane roofing system which enables transferring to the membrane fabricating plant a substantial amount of the labor normally performed on the roof deck, thereby increasing efficiency and reducing labor costs, as well as assuring reliable product quality by providing better quality control. Another object of the present invention is to provide an improved method of securing a membrane roof to a roof deck in a manner which reduces labor and material costs but which does not decrease field performance. It is a further object of the present invention to provide an improved method of securing a membrane roof to a roof deck which permits the use of wider sheets of membrane thereby minimizing the total number of welded seams of the membrane sheets and/or mechanical fastening of the membrane sheets to the roof deck. Yet another object of the present invention is to provide a method of installing a membrane roof to a roof deck that is simple and economical.

SUMMARY OF THE INVENTION

Briefly, according to this invention, there is provided a method of applying a roof membrane assembly to a roof deck. The method includes the steps of providing a roof membrane assembly including a first roof membrane and a second roof membrane. The first roof membrane has at least one longitudinally extending edge and the second roof membrane overlaps the first roof membrane and is bonded along at least one longitudinally extending edge of the first roof membrane to define a membrane flap having a longitudinally extending edge. The roof membrane assembly is then positioned upon the roof deck and at least one roof membrane fastening device is positioned over the first roof membrane and beneath the longitudinally extending membrane flap and secured through the first roof membrane and into the roof deck to secure the roof membrane assembly to the roof deck. The longitudinally extending edge of the membrane flap is then bonded to the first roof membrane such that the membrane flap is bonded to the first roof membrane on opposite sides of the at least one roof fastening device.

BRIEF DESCRIPTION OF THE DRAWINGS

Further features and other objects and advantages of this invention will become clear from the following detailed description made with reference to the drawings in which.

DESCRIPTION OF THE PREFERRED EMBODIMENTS

Figure 1:
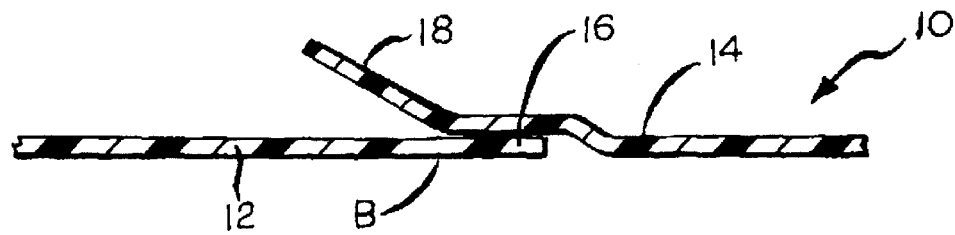
FIG. 1 is a sectional view of a roof membrane assembly including a first roof membrane and a second roof membrane and a membrane flap in accordance with the present invention.

In the following description, like reference characters designate like or corresponding parts.

Referring now to FIG. 1, there is shown a roof membrane assembly 10 including a first roof membrane 12 and a second roof membrane 14. The first roof membrane 12 and the second roof membrane 14 refer to water impermeable single-ply sheets of polymeric material such as thermoplastic olefins, chlorinated polyethylene, polyvinyl chloride, or chlorosulfanated polyethylene or ethylene propylene diene rubber (EPDM) having a preapplied hot melt adhesive such as a commercially available polyester or butyl hot melt and the like. The sheets may be of any suitable length and width as desired. In a preferred embodiment, each sheet is about 6 feet wide such that the roof membrane assembly is about 12 feet wide. However, it will be appreciated that the width of each sheet may be as wide as desired subject to manufacturing constraints.

The first roof membrane 12 has at least one longitudinally extending edge 16. The second roof membrane 14 overlaps the first roof membrane 12 and is bonded to the first roof membrane to define a membrane flap 18. In a preferred embodiment, the second roof membrane 14 is bonded along the length of the least one longitudinally extending edge 16 of the first roof membrane 12. The second roof membrane 14 must overlap the first roof membrane 12 sufficiently to provide a membrane flap 18 capable of extending and covering over the top of the fastening device 20 and capable of bonding to the top surface of the first membrane roof 12 on the opposite side of the fastening device as further described herein. The membrane flap 18 should extend at least about 2.5 inches, and preferably at least about 4 inches from the bond "B" and span the longitudinal length of the first roof membrane 12 and the second roof membrane.

The second roof membrane 14 may be bonded to the first roof membrane 12 using most any technique well known in the art. For example, the second roof membrane 14 may be heat welded to the first roof membrane 12 using a conventional electric heat welder (not shown) which applies heat through a single nozzle to the overlapping membranes and compresses the membranes together through a following roller to aid in making a good bond or weld.

It will be appreciated that it is a feature of the present invention that the roof membrane assembly 10 is preassembled from the first roof membrane 12 and the second roof membrane 14 to simplify field installation of the roof membrane assembly to a roof deck 22 as further described herein thereby allowing for the use of substantially larger sheets of roof membrane with no decrease in wind uplift performance. Moreover, it will be appreciated that any number of roof membrane assemblies may be placed in overlapping relation and bonded to form a preassembled continuous membrane thereby further simplifying field installation.

Figure 2:
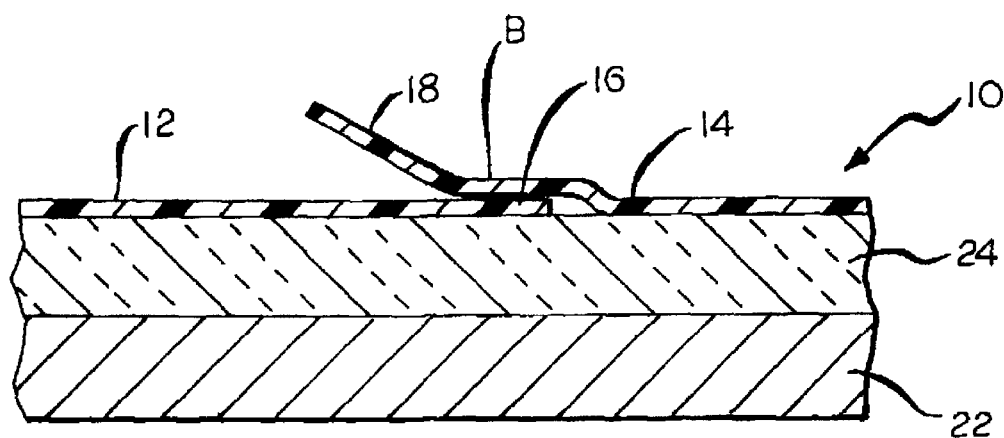
FIG. 2 is a sectional view of the roof membrane assembly of FIG. 1 placed over a roof deck.
Figure 3:
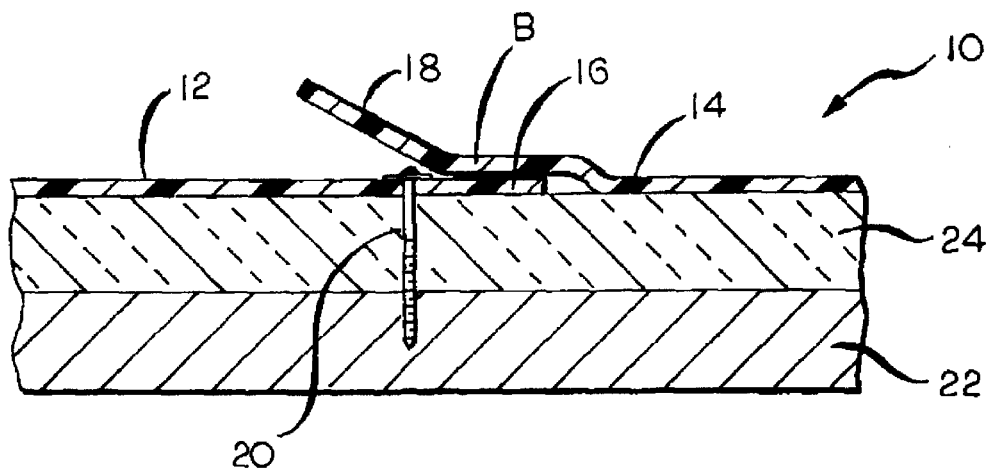
FIG. 3 is a sectional view of the roof membrane assembly of FIG. 2 mechanically fastened to the roof deck.
Figure 4:
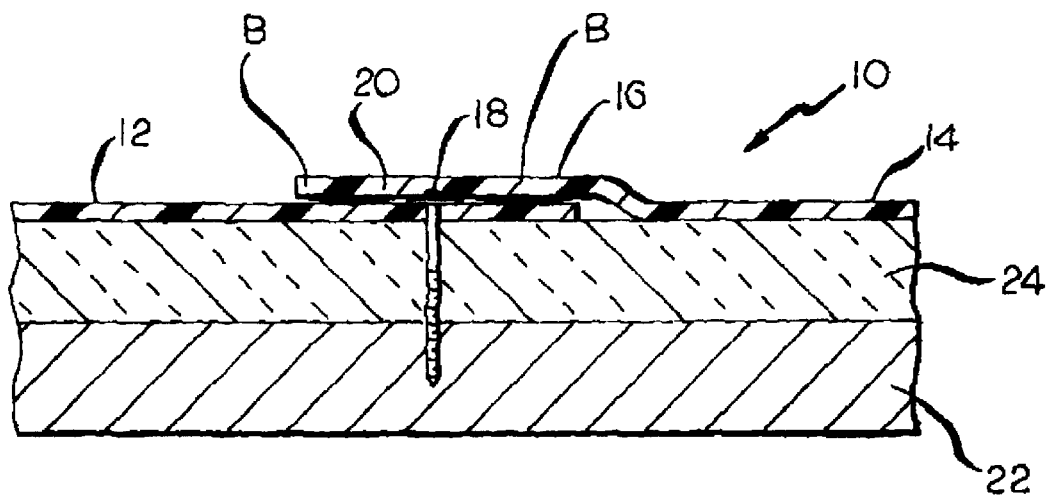
FIG. 4 is a sectional view of the roof membrane assembly of FIG. 3 with the membrane flap secured to the first roof membrane.

As shown in FIGS. 2–4, the roof membrane assembly 10 is positioned upon the roof deck 22. As known in the art, insulation 24 may be applied over the roof deck 22 as desired. Examples of suitable insulation materials include polyurethane, polystyrene, wood fiberboard, polyisocyanarate and the like. At a perimeter of the roof deck 22 is a parapet wall 26 which extends generally perpendicularly upward from the roof deck above the plane of the roof deck. The roof membrane assembly 10 is positioned upon the roof deck 22 and at least one fastening device 20 is secured through the first roof membrane 12 and into the roof deck.

It is a feature of the present invention that the fastening device 20 is positioned over the first roof membrane 12 and beneath the longitudinally extending membrane flap 18. The fastening device 20 penetrates the first roof membrane 12 and into the roof deck 22.

The fastening device 20 may include a plurality of conventional threaded fasteners and seam discs for securing the roof membrane to the roof deck, a plurality of conventional threaded fasteners and one or more batten bars or, if desired, a suitable combination of the foregoing. The threaded fasteners may be conventional screw fasteners of the type commercially available from Olympic Fasteners, ITW Buildex, SFS Stadler and Tru-Fast. Similarly, the batten bars and seam discs may also be of a conventional design and of the type commercially available from Olympic Fasteners, ITW Buildex, SFS Stadler, Tru-Fast and Talan Products Inc.

As shown in FIGS. 3 and 4, to install the threaded fastener of the fastening device 20, the threaded fastener is inserted into a hole in the disc or batten bar and through the first roof membrane 12 and into the roof deck 22 such that the roof membrane assembly 10 is securely fastened in a fixed position. The threaded fasteners are generally installed in the roof deck 22 at a spacing ranging from approximately every 6 inches to every 16 inches depending upon the wind uplift forces experienced by the roof membrane assembly. Under typical conditions, the preferred fastening device 20 spacing is about every 12 inches regardless of the fastening device used.

The longitudinal edge of the membrane flap 18 is then bonded to the first roof membrane 12 such that the membrane flap is attached to the first roof membrane on both sides of the fastening device 20. The longitudinally extending edge of the membrane flap 18 is bonded to the first roof membrane 12 using any suitable technique well known in the art. In a preferred embodiment, the membrane flap 18 is heat welded to the first roof membrane 12 as previously described. It will be appreciated that the membrane flap 18 protects the fastening device 20 from the elements such that water proofing of the fastening device is not required. In addition, the resulting "double seam" bond "B" on each side of the fastening device 20 provides increased wind uplift resistance such that the spacing between rows of fastening devices may be increased with no decrease in wind uplift performance (see FIG. 5). Moreover, by prefabricating the membrane roof assembly with a membrane flap 18, the properties of a "dual weld" membrane roof such as described in U.S. Pat. No. 4,834,828 may be achieved by simple application of a single weld after installation of the membrane roof assembly 10 in accordance with the present invention as opposed to simultaneous field application of a dual weld.

Figure 5:
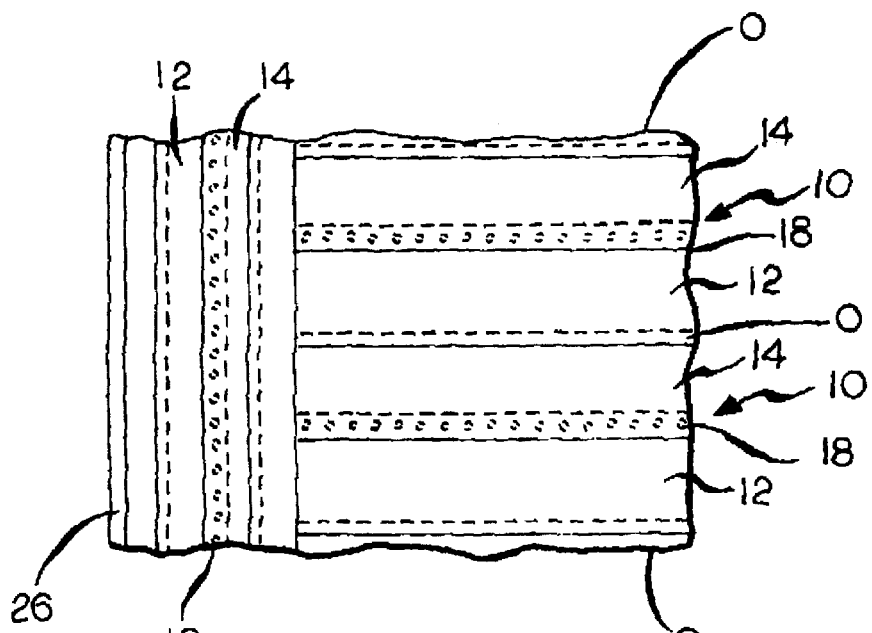
FIG. 5 is a partial top view of a roof deck including a plurality of roof membrane assemblies.

As shown in FIG. 5, a plurality of membrane roof assemblies 10 are secured to a roof deck 22. The roof membrane assemblies 10 are placed in an overlapping relation "O" and bonded together as well known in the art. The overlapping regions of roof membrane assemblies 10 may include additional fastening devices 20 as desired.

It will be appreciated that because the distance between fastening devices 20 can be substantially increased over distances typically used in the past, the time and labor typically required for the installation of the fastening devices is greatly reduced, and since this is a manual on site operation, a large amount of the installation cost is saved.

The invention will be further clarified by a consideration of the following example, which is intended to be purely exemplary of the invention.

EXAMPLE 1

A heat weld system as shown in FIG. 4 was welded on each side of a mechanical fastener and tested in accordance with Factory Mutual wind uplift testing procedures as well known in the art. The heat weld system was tested in a 12 foot by 24 foot chamber having a steel deck on the top surface. The roof system was applied over insulation to the steel deck. The roof system was then pressurized over time from underneath at 15 psf intervals starting at 30 psf. The roof system was held at each interval for 1 minute and then increased until the roof system failed.

With a single weld and number 14 screws at 6 inch on-center spacing a 1–90 rating was achieved. However, with the double weld roof system in accordance with the present invention using number 14 screws at 6 inch on-center spacing a 1–120 rating was achieved.

It is believed that the reason for improved wind uplift resistance was that the roof system was loaded in shear rather than in peel where the values are typically 3–4 times greater. Moreover, the mechanical fastener pulled up straight rather than at an oblique angle as previously experienced which maximized the pull out value of the fastener from the roof deck.

It will be appreciated that there are additional advantages to a double weld system in accordance with the present invention. For example, welds that are only tacked together but are not completely fused are known as cold welds and can drop in peel strength down to a psi—20 psi these values in shear are still 40 psi–60 psi which eliminates many of the quality issues on the roof.

There are also advantages in testing where the system is being cycled. If the roof does not fail from the first wind storm, irreversible damage can occur in a single weld roof system especially where barbed plates are used. This can create tearing of the membrane and make it easier to fail in subsequent storms. It is much more difficult to create irreversible damage to a double welded system because the wind uplift forces experienced are pulling straight up on the top of the membrane with no tearing action.

The documents, patents and patent applications referred to herein are hereby incorporated by reference.

Having described presently preferred embodiments of the invention, it is to be understood that it may be otherwise embodied within the scope of the appended claims.

What is claimed is:

1. A method of applying a roof membrane assembly to a roof deck to cover the roof deck comprising the steps of:
   providing a roof membrane assembly including a first roof membrane and a second roof membrane, said first roof membrane having at least one longitudinally extending edge, said second roof membrane overlapping said first roof membrane and bonded to at least one longitudinally extending edge of said first roof membrane to define a membrane flap having a longitudinally extending edge,
   positioning the roof membrane assembly upon the roof deck; positioning at least one roof membrane fastening device over said first roof membrane and beneath said longitudinally extending membrane flap;
   securing said at least one roof membrane fastening device through said first roof membrane and into the roof deck to secure said roof membrane assembly to the roof deck; and then
   bonding said longitudinally extending edge of said membrane flap to said first roof membrane such that said membrane flap is bonded to said first roof membrane on opposite sides of said at least one roof fastening device thereby providing a dual bond joining said first and second membrane wherein a portion of the first roof membrane and a portion of the second roof membrane [are contiguous] contacts the surface of the roof deck on opposite sides of the dual bond.

2. The method of claim 1 wherein the first roof membrane and the second roof membrane are water impermeable single-ply sheets of polymeric material.

3. The method of claim 1 wherein the first roof membrane and the second roof membrane are water impermeable single-ply sheets of polyvinyl chloride.

4. The method of claim 1 wherein the membrane flap extends at least about 2.5 inches from the bond to said first roof membrane and spans the longitudinal length of said first roof membrane and said second roof membrane.

5. The method of claim 4 wherein said second roof membrane is bonded to said first roof membrane by heat welding.

6. The method of claim 1 wherein said at least one fastening device is at least one threaded fastener and at least one seam disc.

7. The method of claim 1 wherein said at least one fastening device is at least one threaded fastener and at least one batten bar.

8. The method of claim 1 wherein said at least one fastening device are installed in the roof deck at a spacing ranging between about 6–16 inches.

9. The method of claim 1 wherein said longitudinal edge of said membrane flap is heat welded to said first roof membrane such that said membrane flap is bonded to said first roof membrane on both sides of said at least one fastening device.

10. The method of claim 1 further comprising the steps of:
    providing a plurality of membrane roof assemblies to said roof deck in overlapping relation; and
    bonding said overlapping relation.

11. A method of applying a roof membrane assembly to a roof deck comprising the steps of:
    providing a roof membrane assembly including a single-ply first roof membrane and a single-ply second roof membrane, said second roof membrane overlapping said first roof membrane and welded to said first roof membrane to define a membrane flap;
    positioning the roof membrane assembly upon the roof deck;
    positioning at least one roof membrane fastening device over said first roof membrane and beneath said membrane flap;
    securing said at least one roof membrane fastening device through said first roof membrane and into the roof deck to secure said roof membrane assembly to the roof deck; and then
    heat welding said membrane flap to said first roof membrane such that said membrane flap is welded to said first roof membrane on opposite sides of said at least one roof fastening device to provide a dual bond joining said first and second membrane such that a portion of the first roof membrane and a portion of the second roof membrane contacts the surface of the roof deck on opposite sides of the dual bond.

12. The method of claim 11 wherein said at least one fastening device is at least one threaded fastener and at least one seam disc.

13. The method of claim 11 wherein said at least one fastening device is at least one threaded fastener and at least one batten bar.

* * * * *

UNITED STATES PATENT AND TRADEMARK OFFICE
CERTIFICATE OF CORRECTION

PATENT NO. : 6,238,502 B1
DATED : May 29, 2001
INVENTOR(S) : Michael J. Hubbard

It is certified that error appears in the above-identified patent and that said Letters Patent is hereby corrected as shown below:

<u>Title page,</u>
Item [54], Title of the Invention replace "SINGLE-FLY MEMBRANE ROOFING SYSTEM" with -- SINGLE-PLY MEMBRANE ROOFING SYSTEM --.

Signed and Sealed this

Twenty-ninth Day of January, 2002

Attest:

Attesting Officer

JAMES E. ROGAN
*Director of the United States Patent and Trademark Office*